US008966073B2

(12) United States Patent
Li et al.

(10) Patent No.: US 8,966,073 B2
(45) Date of Patent: Feb. 24, 2015

(54) NETWORK COMMUNICATION METHOD AND SYSTEM

(71) Applicant: Tencent Technology (Shenzhen) Company Limited, Shenzhen (CN)

(72) Inventors: Wenzheng Li, Shenzhen (CN); Chaoyu Zhong, Shenzhen (CN); Jian Chen, Shenzhen (CN); Yue Wu, Shenzhen (CN); Ming Xie, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/345,124

(22) PCT Filed: Feb. 28, 2013

(86) PCT No.: PCT/CN2013/071980
§ 371 (c)(1),
(2) Date: Mar. 14, 2014

(87) PCT Pub. No.: WO2013/131440
PCT Pub. Date: Sep. 12, 2013

(65) Prior Publication Data
US 2014/0351431 A1 Nov. 27, 2014

(30) Foreign Application Priority Data

Mar. 9, 2012 (CN) .......................... 2012 1 0061918

(51) Int. Cl.
*G06F 15/173* (2006.01)
*H04L 12/26* (2006.01)

(52) U.S. Cl.
CPC ................ *H04L 43/10* (2013.01); *H04L 43/08* (2013.01)
USPC .......................................................... 709/224

(58) Field of Classification Search
USPC .......................................................... 709/224
See application file for complete search history.

(56) References Cited

U.S. PATENT DOCUMENTS 8,407,347 B2    3/2013  Zhang et al.
8,769,139 B2 *  7/2014  Dazzi ........................... 709/231
(Continued)

FOREIGN PATENT DOCUMENTS

CN    101719833    6/2010
CN    101982955    3/2011

OTHER PUBLICATIONS

International Search Report issued Jun. 6, 2013, in PCT/CN13/071980 filed Feb. 28, 2013.
(Continued)

*Primary Examiner* — Vivek Srivastava
*Assistant Examiner* — Muhammad A Raza
(74) *Attorney, Agent, or Firm* — Oblon, Spivak, McClelland, Maier & Neustadt, L.L.P.

(57) ABSTRACT

A network communication method for use in a system kernel where a network data transceiver thread and a listening socket are created. The method includes steps of: associating the network data transceiver thread with the listening socket and adding the listening socket into an epoll queue; listening, by the listening socket, events in the epoll queue and performing, when sensing an event requiring to transmit/receive data, a specific operation corresponding to the event and sending a notification to the network data transceiver thread associated with the listening socket; and transmitting/receiving, by the network data transceiver thread, a network data according to the notification from the listening socket. A network communication system is also provided.

3 Claims, 4 Drawing Sheets

(56) References Cited

U.S. PATENT DOCUMENTS

2011/0023042 A1* 1/2011 Pope et al. .................. 718/102
2011/0137764 A1 6/2011 Wang et al.

OTHER PUBLICATIONS

Hirabayashi, et al., "Introduction to Tokyo Products", URL:http://fallabs.com/tokyocabinet/tokyoproducts.pdf, Aug. 5, 2010, 34 pages.

* cited by examiner

NETWORK COMMUNICATION METHOD AND SYSTEM

TECHNICAL FIELD

The present invention relates to a field of network communication, and more particularly to method and system for transmitting/receiving network data.

BACKGROUND

In network system architecture, the data transceiver is a very important issue, and the speed of data transceiver directly affects the performance of the network. In the existing technology, the data transceiver is performed by the user mode directly calling the system process. This transceiver manner is direct; however, the system process is required to be called every time when data is transmitted or received. Thus, the system may have a heavy load and consequently the network data transceiver has a poor performance.

SUMMARY OF EMBODIMENTS

Therefore, an object of the present invention is to provide a network communication method to solve the issue of poor network data transceiver performance resulted from directly calling the system process in the user mode in the existing network transceiver technology.

The present invention provides a network communication method for use in a system kernel where a network data transceiver thread and a listening socket are created. The method includes steps of: associating the network data transceiver thread with the listening socket and adding the listening socket into an epoll queue; listening, by the listening socket, events in the epoll queue and performing, when sensing an event requiring to transmit/receive data, a specific operation corresponding to the event and sending a notification to the network data transceiver thread associated with the listening socket; and transmitting/receiving, by the network data transceiver thread, a network data according to the notification from the listening socket.

The present invention further provides a network communication system. The network communication includes a kernel module, which includes a listening socket module and a network data transceiver thread module. The listening socket module is configured to be associated with the network data transceiver thread module, add itself into an epoll queue, listen events in the epoll queue, and perform, when sensing an event requiring to transmit/receive data, a specific operation corresponding to the event and send a notification to the network data transceiver thread module to transmit/receive data. The network data transceiver thread module is configured to be associated with the listening socket module and transmit/receive data according to the notification from the listening socket module.

According to the embodiments of the present invention, by sequentially creating a listening socket in a system kernel, listening events in an epoll queue in the system, notifying a network data transceiver thread to export a function symbol table related to a socket and using a standard system call corresponding to the function symbol table to transmit/receive data in the kernel, a method for transmitting/receiving data, by calling the stand system call after the function symbol table is exported, in a listening time in a kernel process listens is realized. Thus, the issue of low efficiency resulted from directly and frequently using of the standard system call in the prior art is avoided.

BRIEF DESCRIPTION OF THE DRAWINGS

The above embodiments will become more readily apparent to those ordinarily skilled in the art after reviewing the following detailed description and accompanying drawings, in which.

DETAILED DESCRIPTION OF PREFERRED EMBODIMENTS

The disclosure will now be described more specifically with reference to the following embodiments. It is to be noted that the following descriptions of preferred embodiments are presented herein for purpose of illustration and description only. It is not intended to be exhaustive or to be limited to the precise form disclosed.

According to the embodiments of the present invention, by sequentially creating a listening socket in a system kernel, listening events in an epoll queue in the system, notifying a network data transceiver thread to export a function symbol table related to a socket and using a standard system call corresponding to the function symbol table to transmit/receive data in the kernel, a method for transmitting/receiving data, by calling the stand system call after the function symbol table is exported, in a listening time in a kernel process listens is realized. Thus, the issue of low efficiency resulted from directly and frequently using of the standard system call in the prior art is avoided.

First Embodiment

Figure 1:
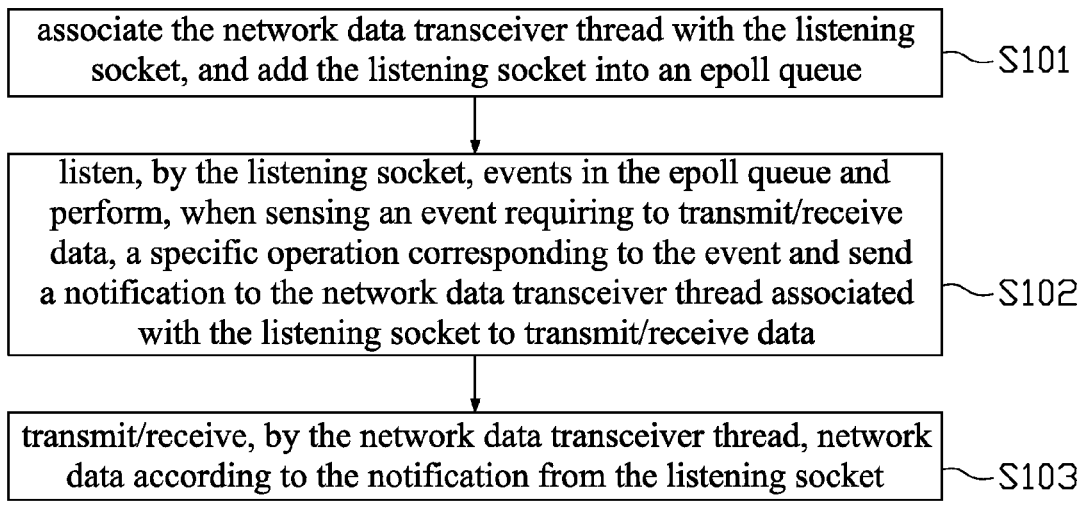
FIG. 1 is a flowchart illustrating of a network communication method in accordance with an embodiment of the present invention.

FIG. 1 is a flowchart illustrating of a network communication method in accordance with an embodiment of the present invention.

In step S101, creating a network data transceiver thread and a listening socket in a system kernel, associating the network data transceiver thread with the listening socket, and adding the listening socket into an epoll queue.

In this embodiment, a network data transceiver thread is created in a system kernel. The network data transceiver thread is configured for a system to receive a variety of data sent from a client end via a network and return the processed data to the client end. In addition, a listening socket is created in the system kernel. The listening socket is bundled to the network data transceiver thread and added into an epoll queue, and thereby being cyclically operated in the epoll queue.

In step S102, listening, by the listening socket, events in the epoll queue and performing, when sensing an event requiring to transmit/receive data, a specific operation corresponding to the event and sending a notification to the network data transceiver thread associated with the listening socket to transmit/receive data.

Figure 2:
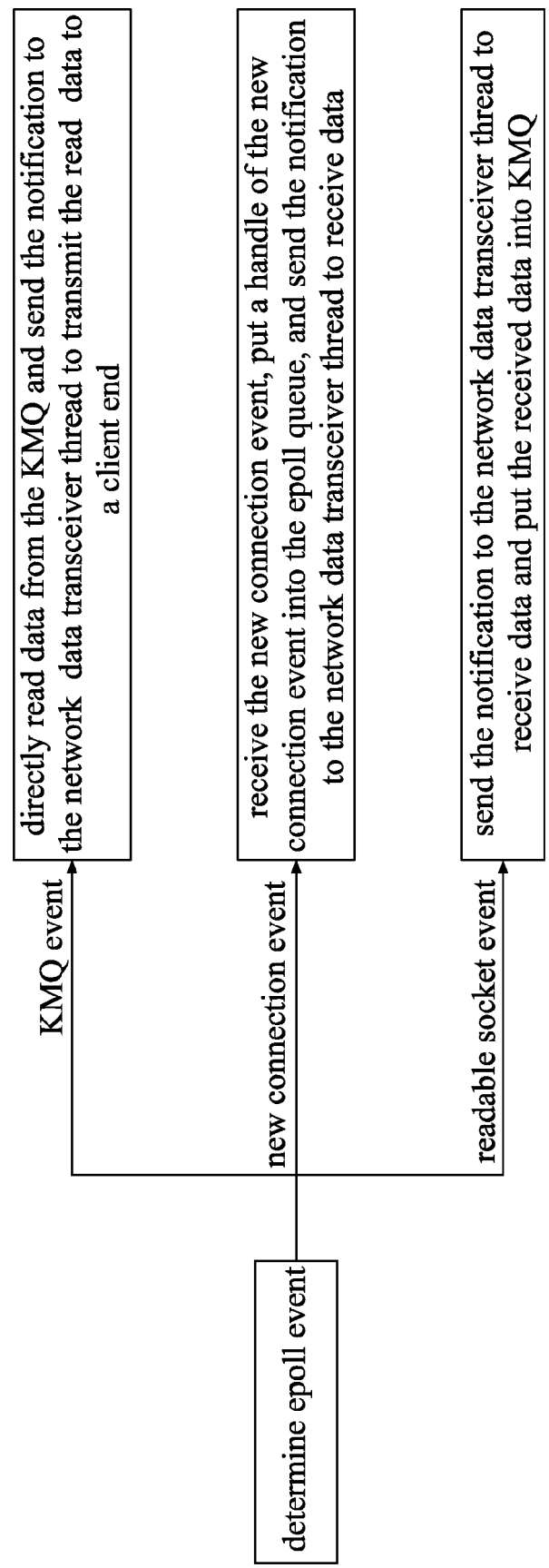
FIG. 2 is a schematic view illustrating that a specific network data processing operation is performed when a respective event is sensed.
Figure 3:
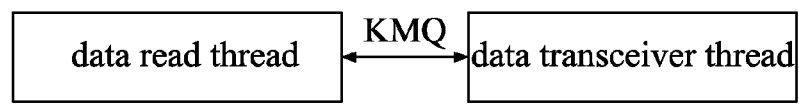
FIG. 3 is a schematic view illustrating that the KMQ is served as a communication channel between a data read thread and a data transceiver thread.

In this embodiment, the listening socket classifies the events requiring to transmit/receive data into three types: a new connection event, a socket event and a KMQ event; wherein both of the new connection event and the socket event are events related to the receiving of network data, and the KMQ event is an event related to the transmitting of network data. Specifically, when sensing an event requiring to transmit/receive data in the epoll queue, the listening socket first determines the type of the event, and send a notification to the associated network data transceiver thread to transmit/receive data. As illustrated in FIG. 2, the specific operations corresponding to the respective events are:

a. for a new connection event, the listening socket is configured to receive the new connection event, put a handle of the new connection event into the epoll queue, and send the notification to the network data transceiver thread to receive data;

b. for a readable socket event, the listening socket is configured to send the notification to the network data transceiver thread to receive data and put the received data into KMQ;

c. for a KMQ event, the listening socket is configured to directly read data from the KMQ and send the notification to the network data transceiver thread to transmit the read data to a client end; wherein the KMQ is served as a communication channel between a data read thread and a data transceiver thread, as illustrated in FIG. 3.

For a KMQ event, the process of directly reading data from the KMQ specifically includes steps of:

mapping, by the data read thread, a memory of the KMQ event to an address space of the data read thread by calling mmap; and accessing, by the data read thread, the memory of the KMQ event through the address space of the data read thread and reading out KMQ data from the memory when the listening socket senses the KMQ event.

Figure 4:
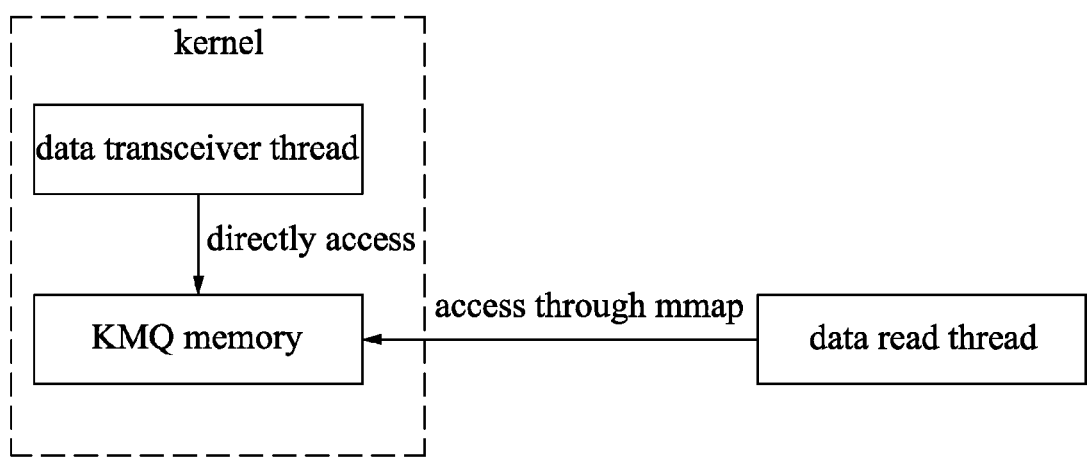
FIG. 4 is a schematic diagram illustrating a relationship among a data read thread, a data transceiver thread and a KMQ memory.

FIG. 4 is a schematic diagram illustrating a relationship among a data read thread, a data transceiver thread and a KMQ memory. As shown, because the KMQ event is created in the kernel, the data transceiver thread created in the same kernel can directly access the KMQ memory and accordingly the data read thread can access the same address of the data transceiver thread by way of mapping; thus, the simultaneousness between the data read thread and the data transceiver thread is realized. In other words, when the listening socket senses a KMQ event, the data read thread can read the KMQ data by accessing the address and transmit the KMQ data to the data transceiver thread for further transmitting.

In this embodiment, although both of the new connection event and the socket event are events related to the receiving of network data, it is to be noted that the socket events are further divided into readable events or unreadable events and accordingly the socket event will be processed different than the new connection event is when being sensed. Specifically, when a readable socket event is sensed, the network data transceiver thread is notified to receive data and the received data is put into the KMQ; alternatively, when an unreadable socket event is sensed, the receiving of the network data is terminated directly.

In step S103, transmitting/receiving, by the network data transceiver thread, network data according to the notification from the listening socket.

In this embodiment, the step of transmitting/receiving network data, by the network data transceiver thread, according to the notification from the listening socket is realized by:

exporting a function symbol table related to an I/O interface socket from the system kernel (for example, exporting the function symbol table of sys_xxx; wherein xxx is a standard system call) and using a standard system call corresponding to the function symbol table to transmit/receive and send data in the kernel.

In this embodiment, by sequentially creating a listening socket in a system kernel, listening events in an epoll queue in the system, notifying a network data transceiver thread to export a function symbol table related to a socket and using a standard system call corresponding to the function symbol table to transmit/receive data in the kernel, a method for transmitting/receiving data, by calling the stand system call after the function symbol table is exported, in a listening time in a kernel process listens is realized. Thus, the issue of low efficiency resulted from directly and frequently using of the standard system call in the prior art is avoided.

Second Embodiment

Figure 5:
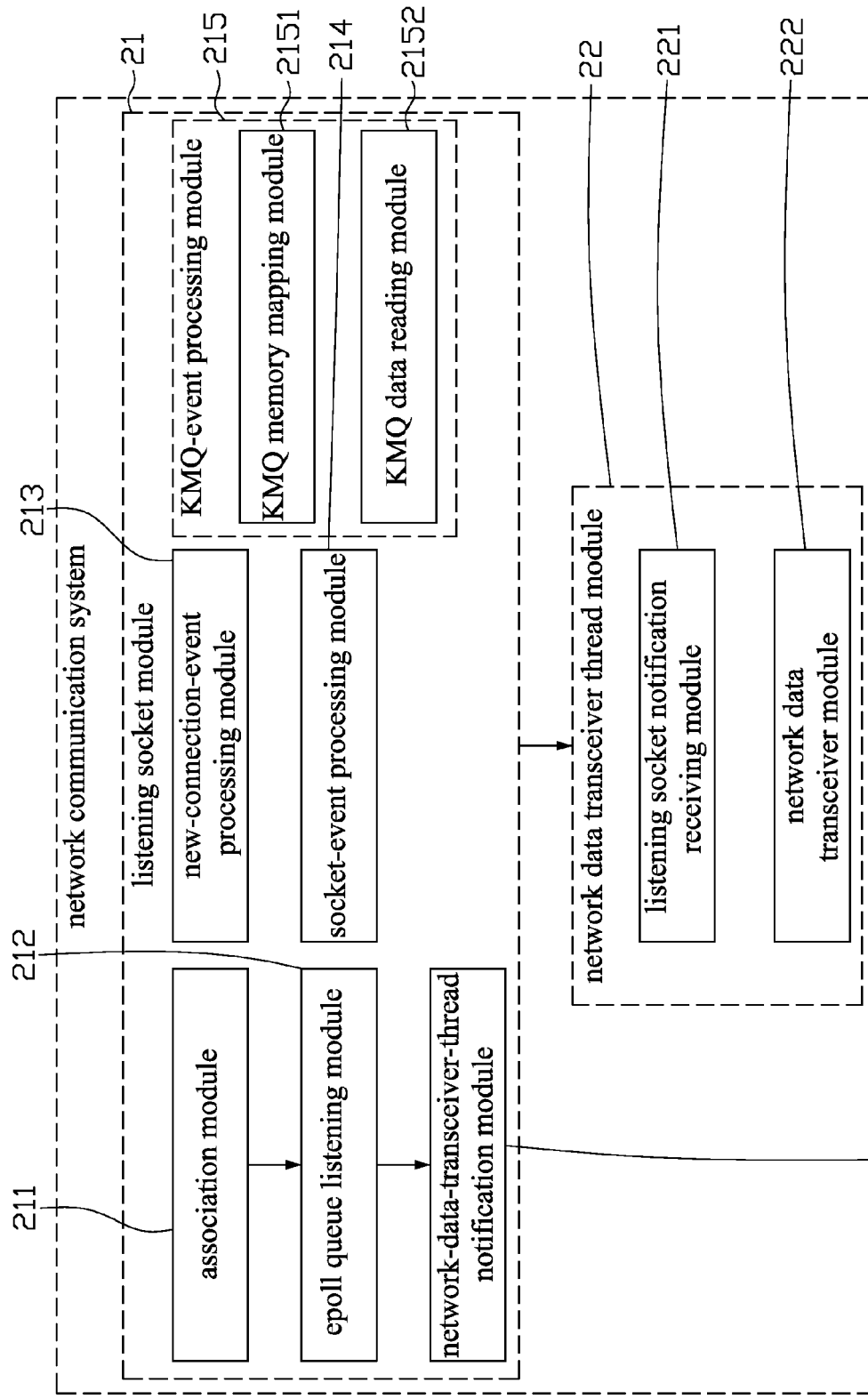
FIG. 5 is a schematic constructive diagram of a network communication system in accordance with an embodiment of the present invention.

FIG. 5 is a schematic constructive diagram of a network communication system in accordance with an embodiment of the present invention. For brevity, it is to be noted that only the parts related to this embodiment are illustrated. As shown, the network communication system in this embodiment includes a listening socket module 21 and a network data transceiver thread module 22.

The listening socket module 21 is configured to be associated with the network data transceiver thread module 22, add itself into an epoll queue, listen events in the epoll queue, and perform, when sensing an event requiring to transmit/receive data, a specific operation corresponding to the event and send a notification to the network data transceiver thread module 22 to transmit/receive data.

The network data transceiver thread module 22 is configured to be associated with the listening socket module 21 and transmit/receive data according to the notification from the listening socket module 21.

The listening socket module 21 includes an association module 211, an epoll queue listening module 212, a new-connection-event processing module 213, a socket-event processing module 214, a KMQ-event processing module 215 and a network-data-transceiver-thread notification module 216.

The association module 211 is configured to associate the listening socket module 21 with the network data transceiver thread module 22.

The epoll queue listening module 212 is configured to listen events in the epoll queue.

The new-connection-event processing module 213 is configured to receive a new connection event, put a handle of the new connection event into the epoll queue, and notify the network data transceiver thread module 22 to receive data.

The socket-event processing module 214 is configured to notify the network data transceiver thread module 22 to receive data of a readable socket event and put the received data into a KMQ.

The KMQ-event processing module 215 is configured to directly read data from the KMQ and notify the network data transceiver thread module 22 to transmit the read data to a client end.

The network-data-transceiver-thread notification module 216 is configured to send the notification to the network data transceiver thread module 22 to transmit/receive data when the epoll queue listening module 212 senses a specific event.

The KMQ-event processing module 215 includes a KMQ memory mapping module 2151 and a KMQ data reading module 2152.

The KMQ memory mapping module 2151 is configured for a data read thread to map a memory of the KMQ event to an address space of the data read thread.

The KMQ data reading module 2152 is configured for the data read thread to access the memory of the KMQ event through the address space of the data read thread mapped by the KMQ memory mapping module 2151 and read out KMQ data from the memory.

The network data transceiver thread module 22 includes a listening socket notification receiving module 221 and a network data transceiver module 222.

The listening socket notification receiving module 221 is configured to receive the notification, for notifying to transmit/receive data, sent from the listening socket module 21.

The network data transceiver module 222 is configured to export a function symbol table related to a socket from a system kernel module (not shown) and use a standard system call corresponding to the function symbol table to transmit/receive data in the system kernel module.

The network communication system provided in this embodiment is corresponding to the network communication method provided in the aforementioned embodiment. To get further detailed information, please refer to the description associated with the first embodiment of the network communication method, and no unnecessary detail is given here.

It is understood, by those ordinarily skilled in the art, that the modules in the network communication system provided by the second embodiment are divided by way of function and logic; and the present invention is not limited thereto if the corresponding functions are achieved. In addition, the specific names for the functional modules are used for distinguishing from each other only; and the present invention is not limited thereto.

In addition, the ordinary skill in the art can understand that all or part of the steps in the aforementioned embodiments can be implemented by a program (constituted by a plurality of program instructions) and related hardware; wherein the program may be stored in a computer readable storage medium, and the storage medium is, for example, a ROM/RAM, disk or optical disk, etc.

In this embodiment, by sequentially creating a listening socket in a system kernel, listening events in an epoll queue in the system, notifying a network data transceiver thread to export a function symbol table related to a socket and using a standard system call corresponding to the function symbol table to transmit/receive data in the kernel, a method for transmitting/receiving data, by calling the stand system call after the function symbol table is exported, in a listening time in a kernel process listens is realized. Thus, the issue of low efficiency resulted from directly and frequently using of the standard system call in the prior art is avoided.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A network communication method for use in a system kernel where a network data transceiver thread and a listening socket are created, the method comprising steps of:

associating the network data transceiver thread with the listening socket and adding the listening socket into an epoll queue;

listening, by the listening socket, events in the epoll queue and performing, when sensing an event requiring to transmit/receive data, a specific operation corresponding to the event and sending a notification to the network data transceiver thread associated with the listening socket; and transmitting/receiving, by the network data transceiver thread, a network data according to the notification from the listening socket, wherein in the step of transmitting/receiving, by the network data transceiver thread, a network data according to the notification from the listening socket comprises:
exporting a function symbol table related to a socket from the system kernel and using a standard system call corresponding to the function symbol table to transmit/receive data in a kernel, the step of performing a specific operation corresponding to the event and sending a notification to the network data transceiver thread associated with the listening socket comprises:
for a new connection event, receiving the new connection event, putting a handle of the new connection event into the epoll queue, and sending the notification to the network data transceiver thread to receive data;
for a readable socket event, sending the notification to the network data transceiver thread to receive data of the readable socket event and putting the received data into a KMQ; or
for a KMQ event, directly reading data from the KMQ and sending the notification to the network data transceiver thread to send the read data to a client end, and the step of directly reading data from the KMQ for a KMQ event comprises:
mapping, by a data read thread, a memory of the KMQ event to an address space of the data read thread through mmap; and
accessing, by the data read thread, the memory of the KMQ event through the address space of the data read thread and reading out KMQ data from the memory when the listening socket senses the KMQ event.

2. A network communication system, the network communication comprising a kernel module, the kernel module comprising:

a listening socket module; and a network data transceiver thread module;

wherein the listening socket module is associated with the network data transceiver thread module, add itself into an epoll queue, listens to events in the epoll queue, and performs, when sensing an event requiring to transmit/receive data, a specific operation corresponding to the event and send a notification to the network data transceiver thread module to transmit/receive data;

wherein the network data transceiver thread module is associated with the listening socket module and transmits/receives data according to the notification from the listening socket module, wherein the network thread transceiver module comprises:
a listening socket notification receiving module that receives the notification, for notifying to transmit/receive data, sent from the listening socket module; and
a network data transceiver module that exports a function symbol table related to a socket from a system kernel module and uses a standard system call corresponding to the function symbol table to transmit/receive data in the system kernel, wherein the listening socket module comprises:
an association module that associates the listening socket module with the network data transceiver thread module;
an epoll queue listening module that listens events in the epoll queue;
a new-connection-event processing module that receives a new connection event, put a handle of the new connection event into the epoll queue, and notify the network data transceiver thread module to receive data;
a socket-event processing module that notifies the network data transceiver thread module to receive data of a readable socket event and put the received data into a KMQ;
a KMQ-event processing module that directly reads data from the KMQ and notify the network data transceiver thread module to transmit the read data to a client end; and
a network-data-transceiver-thread notification module that sends the notification to the network data transceiver thread module to transmit/receive data when the epoll queue listening module senses a specific event, and wherein the KMQ-event processing module comprises:
a KMQ memory mapping module that causes a data read thread to map a memory of the KMQ event to an address space of the data read thread; and
a KMQ data reading module that causes the data read thread to access the memory of the KMQ event through the address space of the data read thread mapped by the KMQ memory mapping module and read out a KMQ data from the memory.

3. A non-transitory computer readable storage medium storing a program causing a computer to execute a network communication method for use in a system kernel where a network data transceiver thread and a listening socket are created, the network communication method comprising steps of:

associating the network data transceiver thread with the listening socket and adding the listening socket into an epoll queue;

listening, by the listening socket, events in the epoll queue and performing, when sensing an event requiring to transmit/receive data, a specific operation corresponding to the event and sending a notification to the network data transceiver thread associated with the listening socket; and transmitting/receiving, by the network data transceiver thread, a network data according to the notification from the listening socket, wherein in the step of transmitting/receiving, by the network data transceiver thread, a network data according to the notification from the listening socket comprises:

exporting a function symbol table related to a socket from the system kernel and using a standard system call corresponding to the function symbol table to transmit/receive data in a kernel, the step of performing a specific operation corresponding to the event and sending a notification to the network data transceiver thread associated with the listening socket comprises:

for a new connection event, receiving the new connection event, putting a handle of the new connection event into the epoll queue, and sending the notification to the network data transceiver thread to receive data;

for a readable socket event, sending the notification to the network data transceiver thread to receive data of the readable socket event and putting the received data into a KMQ; or for a KMQ event, directly reading data from the KMQ and sending the notification to the network data transceiver thread to send the read data to a client end, and the step of directly reading data from the KMQ for a KMQ event comprises:

mapping, by a data read thread, a memory of the KMQ event to an address space of the data read thread through mmap; and accessing, by the data read thread, the memory of the KMQ event through the address space of the data read thread and reading out KMQ data from the memory when the listening socket senses the KMQ event.

* * * * *